(No Model.) 6 Sheets—Sheet 1.

F. H. BOWEN.
MUSIC WRITING MACHINE.

No. 500,793. Patented July 4, 1893.

Witnesses:
J. D. Garfield
N. I. Clemons.

Inventor:
Frank H. Bowen
by Chapin & Co. Attys (No Model.) 6 Sheets—Sheet 2.

F. H. BOWEN.
MUSIC WRITING MACHINE.

No. 500,793. Patented July 4, 1893.

Witnesses:
J. D. Garfield
K. D. Clemons

Inventor:
Frank H. Bowen
per Chapin & Co. attys (No Model.) 6 Sheets—Sheet 3.

F. H. BOWEN.
MUSIC WRITING MACHINE.

No. 500,793. Patented July 4, 1893.

Witnesses:
J. W. Gayfield
H. S. Clemons.

Inventor:
Frank H. Bowen,
per Chapin & Co.
Attys.

(No Model.) 6 Sheets—Sheet 4.

F. H. BOWEN.
MUSIC WRITING MACHINE.

No. 500,793. Patented July 4, 1893.

Witnesses:
Inventor:
Frank H. Bowen, (No Model.) 6 Sheets—Sheet 5.

F. H. BOWEN.
MUSIC WRITING MACHINE.

No. 500,793. Patented July 4, 1893.

Witnesses:
J. D. Gayfield
K. I. Clemons.

Inventor:
Frank H. Bowen,
per Chapin & Co.
Attys.

(No Model.)  
6 Sheets—Sheet 6.
F. H. BOWEN.
MUSIC WRITING MACHINE.
No. 500,793. Patented July 4, 1893.
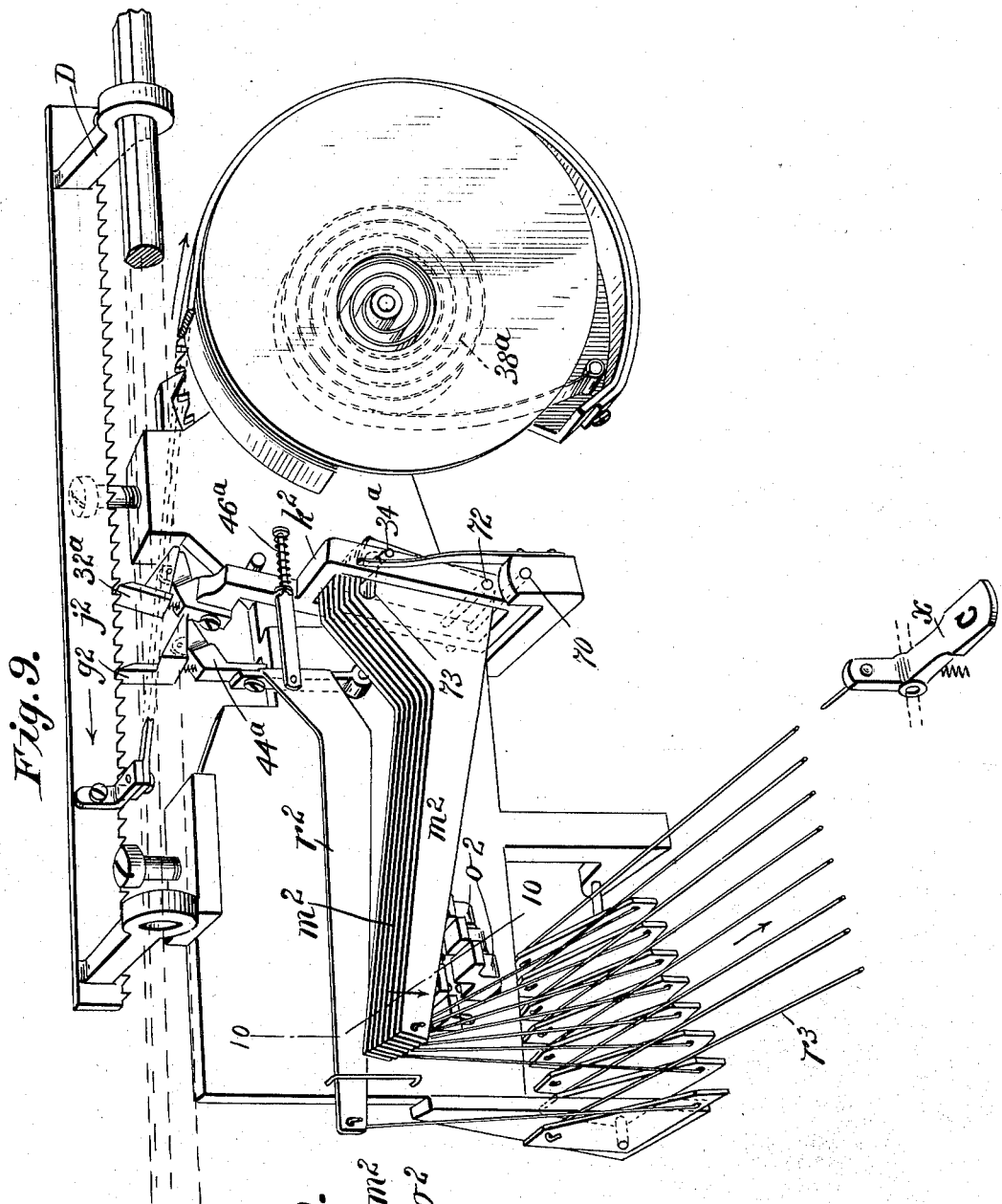
Witnesses.  
J. D. Garfield  
K. I. Clemons
Inventor,  
Frank H. Bowen.  
per Chapin & Co  
Attys

UNITED STATES PATENT OFFICE.

FRANK H. BOWEN, OF SPRINGFIELD, MASSACHUSETTS.

MUSIC-WRITING MACHINE.

SPECIFICATION forming part of Letters Patent No. 500,793, dated July 4, 1893.

Application filed September 22, 1892. Serial No. 446,507. (No model.)

*To all whom it may concern:*

Be it known that I, FRANK H. BOWEN, a citizen of the United States, residing at Springfield, in the county of Hampden and State of Massachusetts, have invented new and useful Improvements in Music-Writing Machines, of which the following is a specification.

The object of this invention is to devise a machine which will be entirely efficient for typewriting music, the aim being to render possible the presentation of the musical composition accurately and with a fair degree of rapidity and in a more legible and attractive form than usual in hand written music.

The invention consists in various novel combinations of devices or instrumentalities, and the construction and combinations of parts all substantially as will be hereinafter more fully exemplified and described, and covered by the claims.

Figure 1:
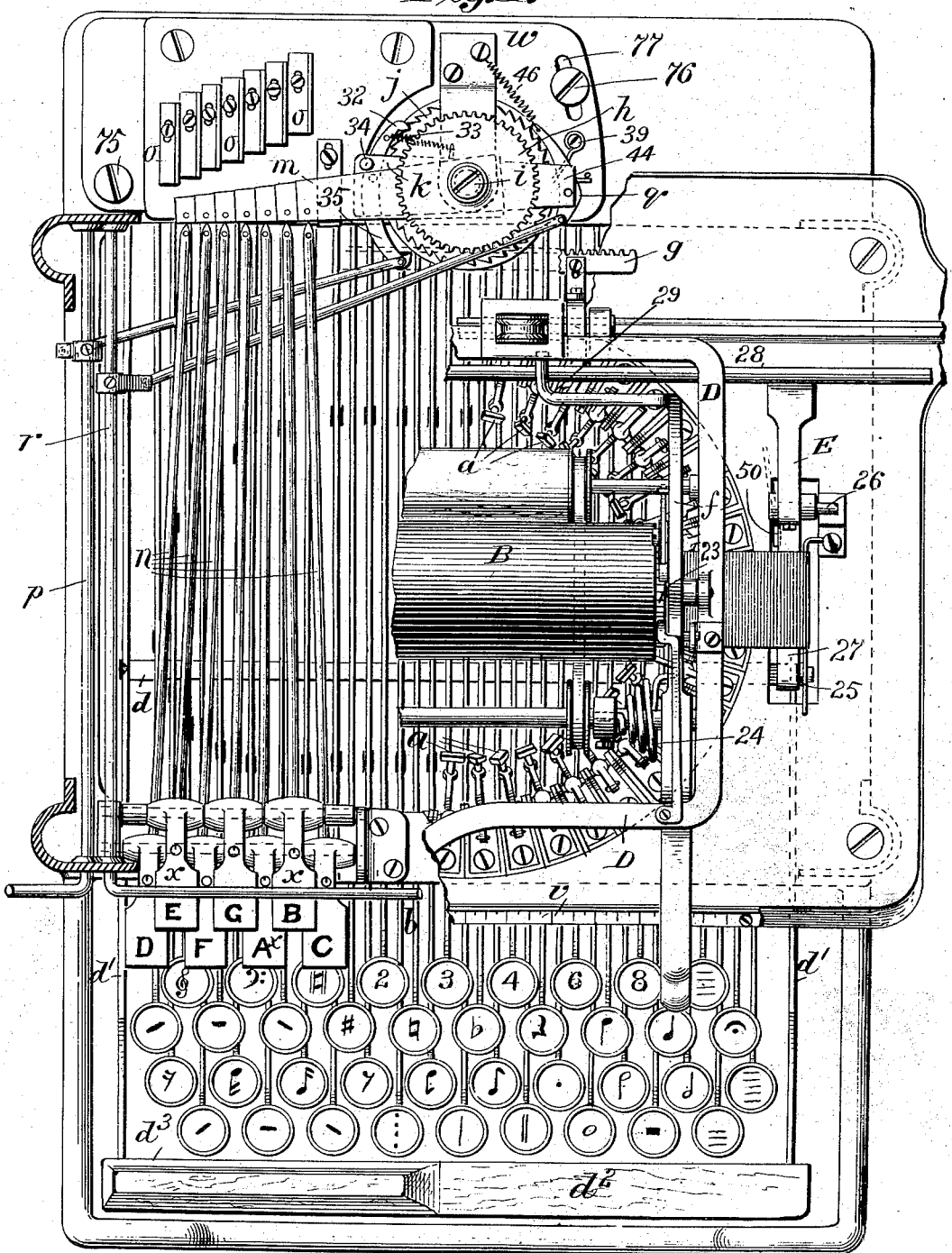
Figure 2:
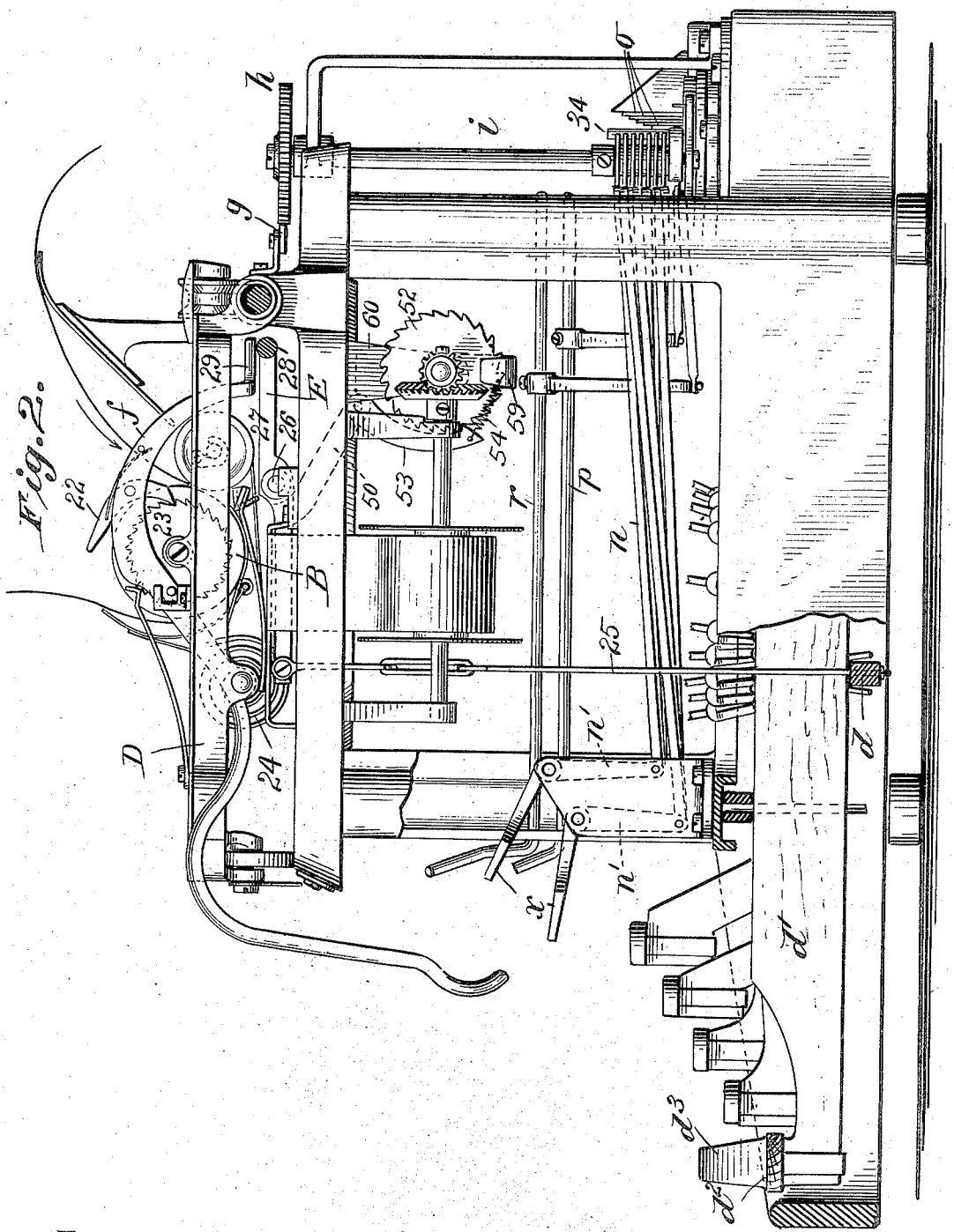
Figure 3:
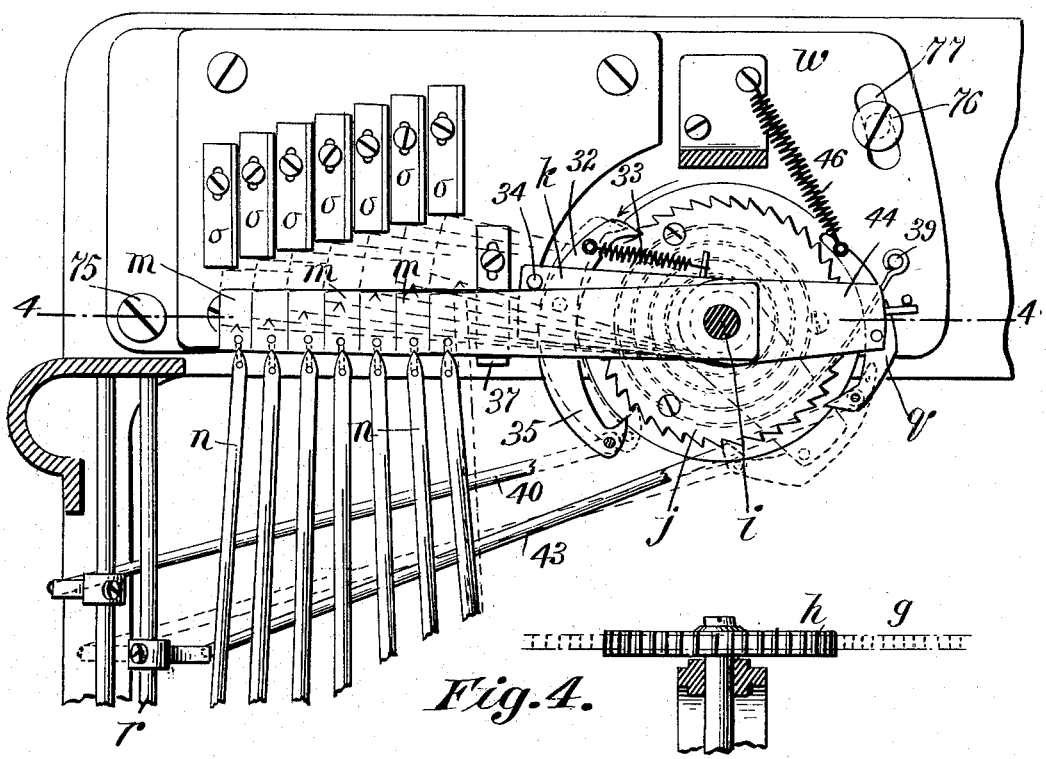
Figure 4:
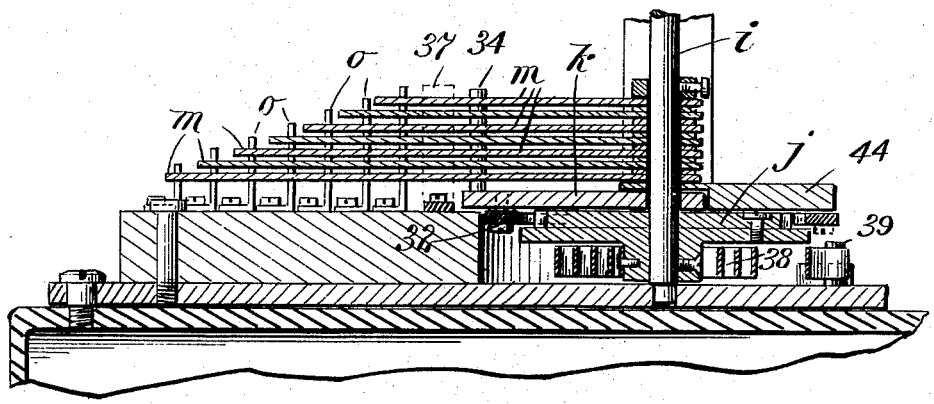
Figure 5:
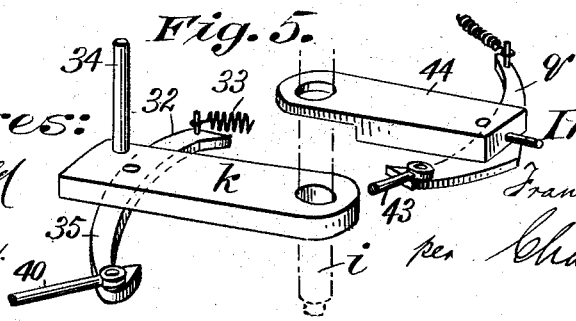
Figure 6:
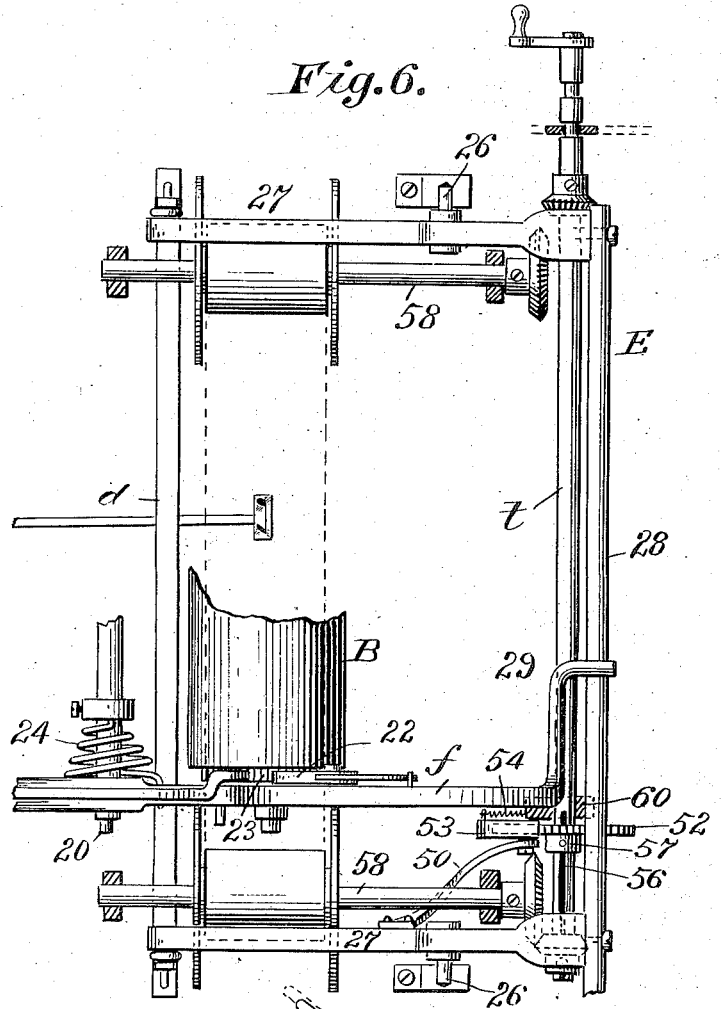
Figure 7:
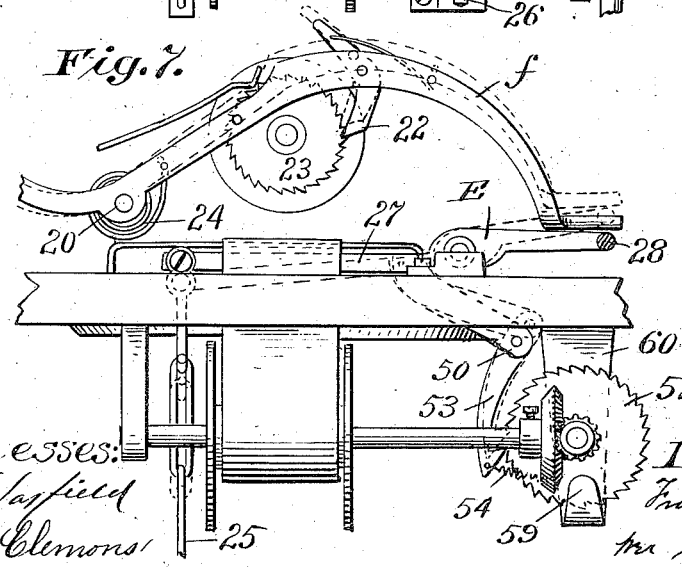
Figure 8:
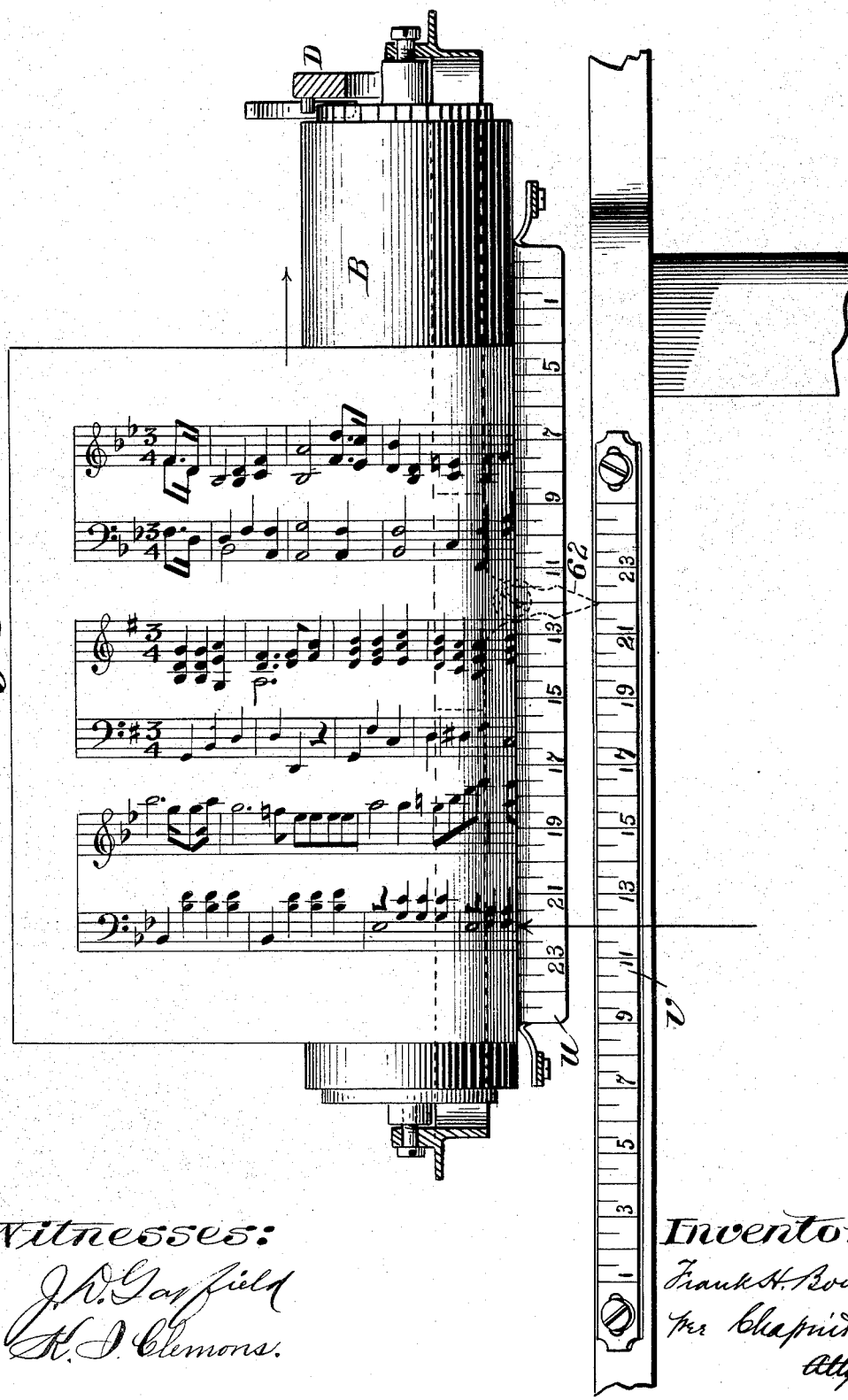

In the accompanying drawings, Figure 1 is a plan view of the improved machine with a portion of the top broken away for clearer illustration. Fig. 2 is a side elevation of the machine with part of the frame broken away. Fig. 3 is a plan view on a somewhat larger scale especially illustrating the note-position-shift and octave-shift mechanisms. Fig. 4 being a vertical section on line 4—4, Fig. 3, while Fig. 5 is a perspective view of detail parts to be hereinafter referred to. Figs. 6 and 7 are, respectively, views in plan and end elevation of the character spacing devices and the ribbon feed mechanism. Fig. 8 is a view in front elevation showing the scales that indicate the relative position of the portion of the paper which is at the point of type impact. Fig. 9 is a perspective view for showing a modification of the note-position-shift, and octave-shift mechanisms which will be hereinafter more fully referred to. Fig. 10 is a view in elevation and vertical section on line 10—10, Fig. 9, showing the graduated position of the stop devices relative to the intermediate levers comprised in the mechanism of said Fig. 9.

In the machine, here illustrated, the frame and construction and arrangement of the type-bars, $a$, and key-levers, $b$, are similar to those of the well known Remington typewriting machine, the type-bars all having their impact against the platen at a point within the center of their circle of arrangement.

The type-bars, $a$, have characters in number and variety to fulfill the requirements of a machine for imprinting musical notation, as will be manifest on taking note of the keyboard represented in Fig. 1.

In the present machine the paper is caused to move, with the lines of the staff thereon, in a direction transversely of the platen on or immediately after the striking of each typebar, and the positions of the notes, or other characters or signs, are insured upon or relative to the staff by imparting to the platen an endwise movement crosswise of the staff lines, in some cases farther than in others, according as the note or character is to be high or low on the staff, the platen endwise returning to the position it had previously occupied which is preferably the one that by reason of predetermination in the arrangement or adjustment of the parts will leave the platen and paper thereon so that, relative to the staff already ruled on, or to be printed on the paper by this machine, down-stem notes will strike in the third space for high C, while those notes with the upward stems will strike in the position below the staff for low C. The carriage, D, for the platen, B, is mounted as common in the aforesaid well known typewriting machine, but its endwise movements are governed for a different purpose and in a much different manner than heretofore, as will be hereinafter set forth.

The universal bar, $d$, is applied in common to, and transversely of, all of the key-levers, as usual, and is actuated by the levers, $d'$, $d'$, which at the front of the key-board have the depression bar $d^2$, but there is a mechanism of connection or engagement between said universal bar and the platen-rotating device so that on each movement of a type-bar for imprinting a character the platen will have a rotational movement for feeding the paper in a direction crosswise of the platen so that the next note or character may be struck at its proper place farther along the staff, such intervening mechanism of connection, however, affording no impediment to the required endwise movement of the platen.

The platen-rotating device consists of the lever, $f$, pivotally mounted as at 20, on the frame or platen carriage, D, said lever having the pawl, 22, which takes into the ratchet-wheel, 23, on the end of the platen roller. A spring, 24, is applied to the pawl-carrying lever for giving it its movement to rotate the platen to the extent of one of the ratchet-teeth thereon when such lever shall have been swung to the limit of its movement against the force of its spring, 24, by the swinging frame E, the swinging movement of which is imparted by the duplicated connecting-rods, 25, upwardly extended from their connections with the universal bar. The said frame, E, consists of the parallel bars or members, 27, 27, extending from front to rear near each end of the machine and the uniting, longitudinal bar, 28, at the rear. The said end members have the aligned journals, 26, 26, whereby the swinging movement of said frame, E, above the top of the main frame of the machine may be upon a horizontal axis.

It will be noted that the pawl-carrying lever, $f$, has the extended arm, 29, at its rear end, which has its position over the longitudinal bar, 28, and is always in engagement therewith. Therefore a depression of any of the type-bar operating key-levers and corresponding movement of the universal bar will effect the downward swinging of the forward portion of said frame, E, and the upward swinging of the rear portion thereof causing, consequently, such a movement of the pawl-carrying lever as to carry the pawl back to take a new tooth on the ratchet-wheel,—the release of the key-lever, permitting the universal bar and frame, E, to come to their positions of rest, allows the aforesaid spring, 24, to react to positively force, through means of the part, $f$, and pawl thereon, the platen around and thus feed the paper thereon across the length of the platen whereby the paper is in position to receive the impact of the type-bar for the next note or other character.

In this machine the ribbon feed is insured, as in other well known typewriters, by imparting intermittently a rotation to the shaft, $t$; but novel means are here employed for imparting such movement to said shaft, $t$. It will therefore be perceived that one of the bars, 27, of the aforesaid tilting frame, E, has the pending arm, 50, extended into proximity to the ratchet-wheel, 52, which is upon and in engagement with the shaft, $t$. Said arm, 50, carries the pawl, 53, which is pivotally mounted thereon and which by the spring, 54, is caused to be properly retained in engagement with this ratchet-wheel. Each time a key-lever for a type-bar is depressed the then rising rear portion of the frame, E, causes the corresponding elevation of the pawl-carrying arm, 50, and upward working thrust of the pawl to effect a rotational movement of the ratchet-wheel and shaft, $t$; and through the engagement of the latter with one of the ribbon-spool shafts, 58—58, the feed movement, as usual, of the ribbon is secured. As the frame, E, returns to its normal position the pawl, 53, recedes to take a new tooth on ratchet-wheel, 52. The said shaft, $t$, as common in typewriters, is endwise movable, so that the bevel gear at either end thereof may be in engagement with the geared shaft of either spool. In order that the endwise shifting of the shaft may not alter the position of ratchet-wheel, 52, relative to the operating pawl therefor, the shaft is longitudinally slotted, as at 56, and the hub of the ratchet-wheel has the pin, 57, which passes for a free sliding movement through said slot. This is practically a spline connection. The ratchet-wheel is held against axial movement by the engagement therewith of the upturned end, 59, of the hanger, 60.

One of the type-bars has thereon five short, parallel lines extending from front to rear and at right angles to the length of the platen by the use of which, striking the corresponding key therefor successively, staff lines can be formed from end to end of the sheet on which the notation, &c., may then be imprinted (as the staff-lined paper is again run across the platen) by the manipulation of the other type-bars and the giving of proper endwise movements to the platen, as will hereinafter be rendered clear. The imprinting of the musical characters along the paper may, however, be concurrently with the imprinting of the short sections of the staff.

Those type-bars of the machine which have the notes with the upward stems are so arranged and adjusted as to strike (when the paper with the staff is in the proper relation on the platen to the type-impact point) in the position of low C while those notes with their stems downward strike at the third space on the staff for high C, the stems extending across the staff the distance of an octave.

By the key-board the machine is seen to have half, quarter, eighth and sixteenth notes to strike at the low positions relative to the staff, and half, quarter, eighth and sixteenth notes which will strike upon or relative to the staff an octave higher. The whole note, under the conditions just above stated, is adjusted on the type-bar so as to strike the position for high C.

In order that any of the aforesaid notes may have its impression upon the staff at any of the positions other than high or low C, as D, E, F, &c., the platen is caused to be moved endwise so that such space or line corresponding to the desired position for the note will be coincident with the impact point of the type-bar. The means for governing and restraining the platen for this purpose will be now described. The platen supporting carriage has, on its rear edge, a rack-bar, $g$, in mesh with which is the spur-gear wheel, $h$, which is fixed to the top of the vertical shaft, $i$, for which suitable bearings are provided. This shaft has, at or near its lower end, the fixed ratchet-wheel, $j$, and also has, in engagement therewith for a swinging movement independently of the shaft, but from it as the center of movement, the arm, $k$. This arm, at or near its outer end, has the pawl, 32, which is normally pressed by the spring, 33, to its working engagement with said ratchet-wheel. Said pawl has extended from the other side of its pivot the hooked arm, 35, whereby the two-membered part, 32, 35, becomes an escapement for purposes which will be hereinafter set forth. The pawl-carrying bar, k, has thereon a fixed post, 34. There are seven bars, m, which have their perforated ends in engagement with the said shaft, i, whereby they may swing readily therefrom but independently of each other and of any rotational movement of said shaft. The said bars, m, are of variable lengths, as clearly seen in the drawings, and to the free end of each is linked the rear end of a connecting rod, n, which several connecting rods forwardly extend to pivotal connections with the lower arms, n', of the elbow-levers, the forwardly extended arms of which have the indications, D, E, F, G, A, B, C, and constitute the note-position-shift keys, x. The said bars, m, all have their rear edges in engagement with the aforesaid post, 34, of the pawl-carrying arm; and said bars are adapted to have imparted to them through said position-shift keys, x, variable swinging movements in regularly graduated extents by reason of the positions at the rear, respectively of each, of the stops, o; and said swinging movements of the said bars, m, by engagement with the post, 34, correspondingly swing the pawl-carrying arm, k, and pawl and effect the partial rotation of the ratchet-wheel, and shaft and gear, h, and consequently the desired degree of endwise shifting movement of the platen. These parts last referred to are caused to resume their normal positions (normal positions of the bars, m, being regulated by the stop, 37,) by reason of the volute spring, 38, one end of which is attached to the hub of the ratchet-wheel which is as one with the shaft, i, the other end of this spring being secured to the stud, 39, which is on the support for this mechanism. The top of the staff is understood as being toward the right hand end of the platen (see Fig. 8) and therefore the depression of any of the position-shift keys, x, will effect the movement of the platen to the left, more or less, according as to which one of said keys is depressed, and therefore the line or space in positions on the staff to receive the notes corresponding to the depressed key will be coincident with the impact point. Therefore, of course, to strike a note in the C position the key corresponding to the type-bar for such note is depressed without shift of the platen, but for printing the note for D, the first shift-key at the left is depressed, previously to striking the type-bar key, whereupon the platen will be moved endwise to the left in the extent of one-eighth of an octave, the depression of each succeeding shift-key moving the platen in a correspondingly increased extent.

Additional devices for shifting the platen endwise are embodied in the present machine, the shifting movements secured by such being in steps equal to half-octaves, whereby the operator may bring the musical notation either a half or a whole octave or other distance equal to some multiple of a half octave higher or lower on the staff upon which he has been writing, or whereby he may bring another staff,—nearer the one or other edge of the paper,—in a proper relative position to the impact point. Where paper with already ruled staves is used the staves are separated by a dimension which is a multiple of the half octave space. The mechanisms for imparting these movements of the platen will be herein termed the "octave shift upward" and the "octave shift downward." The octave shift downward secures the movement of the platen to the right and is, through means of the operation of the escapement, constituted by the pawl, 32, and said hooked arm, 35, the movements to which are imparted by the operation of the connecting-rod, 40, and the cranked rock-shaft, p. By merely rocking the latter shaft the pawl, 32, is caused to be swung out of engagement with the ratchet-wheel leaving it subject to the rotational movement of said volute spring, 38, but before the ratchet-wheel can have a movement to the extent of more than half a tooth the hook-ended portion, 35, comes to its arresting engagement with the ratchet-wheel; then releasing the operating pressure on the rock-shaft, p, the escapement is freed to permit the movement of the ratchet-wheel to the extent of the other half of its tooth. The rotational movement of the ratchet-wheel to the extent of a tooth of course insures a corresponding movement to the platen crosswise of the run of the staff lines equal to the half octave and by repeating the manipulation, as described, the escapement will be permitted to release the ratchet-wheel for any number of octaves of shift. The octave shift upward is secured by the operation of the mechanism consisting of a pawl, q, the connecting-rod, 43, and the cranked rock-shaft, r. Said pawl is pivotally mounted intermediately of its length on the bar, 44, which swings from its center of movement at its point of loose engagement with the aforesaid shaft, i. The pawl and said bar are normally held rearward, and the pawl out of engagement with the ratchet-wheel, by the spring, 46. The line of extension of said connecting-rod, 43, is such from the working end of the pawl that as said rod is drawn by the operation of the cranked rock-shaft, r, the pawl will be swung against the spring into engagement with a tooth of the ratchet-wheel and will, in its continued movement, force the ratchet-wheel around one or more teeth and against said volute spring, 38, the ratchet-wheel clicking past the aforesaid pawl, 32, which has been described as constituting an important element in the note-position shift-mechanism and also in the octave shift downward. By listening and counting the number of teeth of the ratchet which click past said pawl, 32, the extent in octaves or half octaves of the upward shifting movement may be determined, or the movement in the working direction of the arm, 44, may be limited by any suitable stop. This mechanism will operate accurately, without any nicety of special adjustment, so long as the relative dimensions of the ratchet-teeth to the gear and rack are correctly proportioned for the reason that in the movements of the rock-shaft, $r$, and connecting-rod, 43, some degree of lost motion of the pawl, $q$, is permitted before it takes the ratchet-teeth, and if said movements are such, furthermore, as to force the ratchet-wheels one or more teeth and a fraction past the pawl, 32, the volute spring will, on the release of the working pressure for the octave-shift-upward mechanism, immediately effect the reversed rotational movement of the ratchet-wheel in the extent of such fractional part of a tooth, bringing its tooth last passed back against the said pawl, 32.

The great care to be observed in the use of the machine is to the effect that when the pawl is in engagement with any of the ratchet-teeth the paper on the platen is to be so adjusted that the staff will have its C positions exactly in coincidence with the impact points of the note type-bars, or at a distance of a half octave or some multiple thereof, therefrom.

In addition to the type-bars having notes there are type-bars for imprinting the various clefs, and figures for indicating time; and the height at which these would strike when the platen is unshifted being, for instance, near the top of the staff while in order to have one of the figures strike on the staff under an already struck upper figure the downward octave shift mechanism may be utilized for moving the platen after which the platen should be restored by the use of the upward-octave-shift mechanism. The positions of the sharps and flats and the natural sign and of the rests and note prolongation dots may be assured by proper manipulation of the position-shift devices by an operator who shall have become conversant with the capabilities of the machine, and notes may be tied together by the flags or tie-bars after they shall have been struck, signs therefor for tying ascending, descending, and level notes being provided upon different type-bars, one set of such signs being provided for notes with stems up and one set for notes with stems down, and they are arranged to normally strike at the ends of any of the note stems by means of the position-shifts to merely form, or to form and tie eighth, sixteenth, thirty-second and sixty-fourth notes. There are type-bars, also, for giving added lines above and added lines below. The former type-bar has three or four lines thereon which when a key is depressed and the platen is in a nomal position will come coincident with the lines of the staff, and after being struck will be unperceived, but in order to have one or more thereof appear above a staff the one or the other of the position-shift keys, $x$, is to be held depressed while the adding line type-bar is being struck.

There is in addition to the type-bar having lines thereon for adding above the staff, another type-bar having three spaced lines thereon corresponding to the indication on the lower right hand key, Figure 1, which lines are so adjusted on the type-bar as to have one thereof strike at the low C position while the others coincide with the staff lines. In order to bring three of these lines below the staff the platen may be moved the distance of an octave by operating the downward octave shift and then operating the position-shift key, F, or if only two lines below are desired the particular one, A, of the note-position-shift-keys, $x$, should be depressed after the establishment of the said newly set position by the downward octave shift It is not deemed desirable or necessary herein to specify the equipment in this machine of any particular set or series of characters upon the type-bars, nor to dwell at further length upon the mode of operation of the mechanisms to produce musical compositions for such will become the province of the musician and the operator; facility and proficiency being assured commensurate with the aptitude of the person; for with a series of typebars having the notes or signs in suitable number and variety, and with the capabilities for note-position-shift, and upward and downward shift of half octaves or multiples thereof, as hereinbefore rendered clear, it will quickly become practicable to the operator or musician to secure the placing of any note or sign at any position on or relative to the staff, or one note or sign suitably adjoining or relative to another. Scales are provided, one,—$u$, on the platen carriage with which the staves on the paper may register and the other, $v$, on the front of the main frame of the machine with which the pointer, 62, on the platen carriage, may register. Each division of the scale indicates a half octave space. The arrow on Fig. 8 indicates the common point of impact of the type-bars, relative to which different positions in the length of the platen may be brought.

In reference to Figs. 1 and 2 it will be observed that the depression bar, $d^2$, for operating the frame comprising the universal bar is provided, at its end which is opposite the note position-shift-keys, $x$, with a raised portion, $d^3$, which renders possible the use of one hand for simultaneously holding down the universal-bar and a position-shift-key, so that with the other hand a sign may be struck relative to an already printed properly positioned note, without advancing the paper. The said raised portion, $d^3$, also renders it easy to span by the one hand the key-board when the operator desires to operate either of the octave-shifts without advancing the paper.

A characteristic in this machine will have been perceived to consist in the arrangement on the type-bars of those notes and characters which extend crosswise on the staff, whereby the lengthwise extents thereof range longitudinally of the platen. Therefore a flat platen bearing is afforded throughout the entire length of the note and its stem, &c., or of the other characters for insuring clear impressions.

As it may be desirable to typewrite music on staff-ruled paper where the spaces are of different widths, interchangeable gears of different sizes may be accordingly substituted for the one $h$. It will be observed that the shaft and ratchet-wheel, $i, j$, and the proximate co-acting parts, $k, m, o$, &c., are supported on a base plate, $w$, which is adjustable by reason of having the capability to swing from the screw or bolt, 75, as a center and of being held in its properly adjusted position by the screw, or bolt, 76, passed through the slot, 77.

The idea of means which embodies the combination with a platen, type-bars and key-levers therefor, of a series of position-shift keys and mechanism intervening between each and the platen whereby the operations of these keys will insure varying extents of endwise movements of the platen, is shown in Fig. 9 as susceptible of being carried out by parts in form and arrangement somewhat different from those shown in the preceding drawings, and in said Fig. 9 the rear portion or extension of the platen supporting carriage is indicated at $D^2$, and is provided with the ratcheted bar, $j^2$. A stirrup-shaped frame, $k^2$, pivotally mounted as at 70, carries at its upper end the pivoted and spring-pressed pawl, $32^a$, which has an engagement with said ratcheted bar, $j^2$. The series of bars, $m^2$, have, by bell-cranks and connecting-rods, operative engagements with the position-shift keys, $x$, said bars, $m^2$, being pivotally mounted, as at 72, on the stirrup-frame near the pivotal support, 70, of the latter. Each of said bars, $m^2$, has a slot, 73, the rear end of which lies, when the parts are in their normal positions, against the pin, $34^a$, of the stirrup-frame, $k^2$. The stops, $o^2$, having graduated positions permit correspondingly varying extents of swinging movement of said bars, $m^2$, when their respectively connected shift keys, $x$, are operated, and each of these bars by having the rear edge of its slot in engagement with said pin, $34^a$, effects the swinging of the stirrup-frame in the given degree, (without effect upon any of the other pivoted bars, $m^2$) and consequently forces the rackbar, $j^2$, and platen carriage endwise in the proportionate degree for the note-position-shift. The spring, $38^a$, insures the return of the ratcheted bar of the carriage to the given set position which it had previously occupied. In this said Fig. 9 is also embodied a modification in an octave-shift device which consists in the pivotally mounted and swinging frame, $44^a$, carrying thereon the pivoted and spring-pressed pawl, $q^2$, which is in engagement with the teeth of said ratcheted bar, $j^2$.

This pawl-carrier has the operating connections, $r^2, r^3$, for imparting an endwise movement to the ratcheted-bar somewhat, or several times, greater than the distance between two of its teeth. As the said parts are operated one or more of the teeth click past the pawl, $32^a$, which holds so much on the ratchet bar as the pawl, $q^2$, gains for it, minus any fraction of a tooth between the one which last passed the pawl, $32^a$, and the next tooth to the right. On the release of the force applied for operating the pawl, $q^2$, it and its carrier resume their normal positions by reason of the spring, $46^a$.

What I claim, and desire to secure as my invention, is—

1. In a music writing machine the combination with a series of type-bars and operating keys therefor, and a bodily and longitudinally shiftable platen, and means for feeding the paper in a direction across the platen which is in a direction at right angles to its shifting movements, of a series of position-shift keys and mechanism intervening between each and the platen whereby the operations of these keys will insure varying extents of endwise bodily movement of the platen, substantially as and for the purpose set forth.

2. In a music writing machine in combination, a series of type-bars and operating keys therefor, a platen bodily and longitudinally movable and devices for temporarily restraining it in given set positions, position-shift keys and mechanism between them and the platen for shifting the platen endwise in one direction from its given set position, and a spring applied for operative action relative to the platen for returning it to its given set position, substantially as and for the purposes set forth.

3. In a music writing machine, a series of type-bars and operating keys therefor, a platen endwise movable and means for effecting a rotational movement of the platen on the depression of any of the type-bar keys, a series of position-shift keys and mechanism between same and the platen for moving the platen endwise on operating said shift keys in varying extents, substantially as described.

4. In a music writing machine in combination, a series of type-bars and operating keys therefor, an endwise movable platen and devices for temporarily restraining it in any one of several given set positions, and a series of shift devices for moving the platen endwise into any desired one of its given set positions, substantially as described.

5. In a music writing machine in combination, a series of type-bars and operating keys therefor, a longitudinally shiftable platen and devices for temporarily restraining it in any one of several given set positions and a shift mechanism for positively moving the platen in one direction from one to a certain other of its given set positions, and a shift mechanism for positively moving the platen from one to a certain other of its given set positions in the reverse direction, substantially as and for the purposes set forth.

6. The combination with a platen of type-bars having musical characters and signs, and operating keys therefor, of character position-shift-keys and mechanism between same and the platen for moving the platen in respectively varying extents, and means for returning the platen on the release of any character-position shift-key to the position it occupied before the operation of such key, means for imparting a feed movement to the paper in a direction transversely of the platen, mechanism for shifting the platen at right angles to the line of the note-spacing feed movement and for temporarily retaining it in its newly set position, for the purposes set forth.

7. In a music writing machine the combination with a type bar having lines spaced corresponding to those of a given staff and a connected operating key for said type-bar, of a series of position-shift-keys and the platen and mechanism intervening between each and the platen whereby varying extents of endwise movement of the platen may be insured so that by the depression of the shift-keys and the key of said lined type-bar, the impression face on the latter may strike the paper on the platen relative to the staff with all its lines above or below, or with some thereof above or below, the others striking coincident with the staff lines, substantially as described.

8. In a music writing machine the combination with the platen and a support therefor which is endwise movable, of a shaft having a propelling engagement with the platen and provided with a ratchet-wheel, a pawl in engagement with the ratchet-wheel and a reciprocatory carrier for said pawl, a series of reciprocatory bars each adapted for an engagement with the said pawl-carrier, stops for the several bars so arranged relatively thereto that the bars may have movements in varying degrees, a series of position-shift keys and connecting-rods between them and said bars, substantially as described and for the purpose set forth.

9. In a music writing machine the combination with the platen and an endwise movable support therefor provided with a rack, g, of the shaft, i, having the ratchet-wheel fixed thereon, and a retracting spring, 38, the bar, k, having an abutment member, 34, thereon, and the pawl, 32, the series of swinging bars, m, the stops, o, having graduated positions, the position-shift keys, x, and the connecting-rods between them and said bars, m, substantially as described.

10. In a music writing machine the combination with the platen, and an endwise movable support therefor, of a shaft having a propelling engagement with the platen-support and provided with a ratchet-wheel, a suitably mounted pawl, q, adapted for engagement with the ratchet-wheel, the cranked rock-shaft, r, and connecting rod, 43, and another pawl normally in engagement with the said ratchet-wheel, substantially as described.

11. In a music writing machine the combination with the platen, and an endwise movable support therefor, of a shaft having a propelling engagement with the platen-support and provided with a ratchet-wheel, a spring, 38, connected for reaction with said ratchet-wheel, an escapement having one member thereof normally in engagement with the ratchet-wheel, and a device for operating the said escapement, substantially as and for the purpose set forth.

12. In a typewriting machine the combination with the rotatable platen having the ratchet-wheel, 23, thereon, and a supporting carriage for the platen having the lever, f, pivotally mounted thereon, which lever carries the pawl, 22, and the spring, 24, applied to said lever, the rocking-frame, E, pivotally mounted and having an engagement with an arm of said pawl-carrying lever, f, the universal-bar, and a connecting-rod between it and said frame, E, substantially as described.

13. In a typewriting machine the combination with a pair of ribbon-spools and shafts on which they are mounted provided with beveled gears and the shaft, t, having beveled gears, and being endwise movable for a propelling connection with the one or the other of said spool-shaft gears, and having a ratchet-wheel, 52, with which it is substantially spline-connected, the rocking-frame, E, having the arm, 50, with the pawl, 53, the universal bar, d, and the connecting-rod, 25, between it and said rocking-frame, substantially as described.

14. In a typewriting machine the combination with a series of key-levers and operating keys therefor, of the platen, one or more position-shift keys therefor, the frame having the universal bar and a bar in front of the key-board which has the elevated portion, $d^3$, opposite the shift-key or keys, substantially as and for the purposes set forth.

15. In a music writing machine the platen support or carriage having the rack, g, of the adjustable base, w, having the shaft adapted to receive interchangeable gears to mesh with said rack, and having the stops, o, o, the ratchet-wheel, j on said shaft, a pawl and carrier therefor the reciprocatory bars, m, m, and the position-shift keys connected to the bars, substantially as and for the purpose set forth.

FRANK H. BOWEN.

Witnesses:
WM. S. BELLOWS,
K. I. CLEMONS.